United States Patent
Lin et al.

(10) Patent No.: US 6,313,210 B1
(45) Date of Patent: Nov. 6, 2001

(54) SILICA-REINFORCED RUBBER COMPOUNDS CONTAINING MOISTURE STABILIZED POLYMERS

(75) Inventors: Chen-Chy Lin, Hudson; Terrence E. Hogan, Cuyahoga Falls; William L. Hergenrother, Akron, all of OH (US)

(73) Assignee: Bridgestone Coporation, Tokyo (JP)

( * ) Notice: Subject to any disclaimer, the term of this patent is extended or adjusted under 35 U.S.C. 154(b) by 0 days.

(21) Appl. No.: 09/630,343

(22) Filed: Jul. 31, 2000

(51) Int. Cl.$^7$ .................................................. C08K 3/34
(52) U.S. Cl. .................................................. 524/492
(58) Field of Search ............................................. 524/492

(56) References Cited

U.S. PATENT DOCUMENTS

| | | | |
|---|---|---|---|
| 3,021,292 | 2/1962 | Hurd et al. ................................. | 260/3 |
| 3,244,664 | 4/1966 | Zelinski et al. ....................... | 260/41.5 |
| 4,104,322 | 8/1978 | Snavely ................................. | 260/827 |
| 4,185,042 | 1/1980 | Verkouw ................................. | 525/332 |
| 4,201,698 | 5/1980 | Itoh et al. ................................. | 260/3 |
| 4,429,091 | 1/1984 | Hall ....................................... | 526/181 |
| 4,818,790 * | 4/1989 | Ooka ....................................... | 525/103 |
| 5,066,721 | 11/1991 | Hamada et al. ....................... | 525/102 |
| 5,227,425 | 7/1993 | Rauline ................................. | 524/493 |
| 5,268,439 | 12/1993 | Hergenrother et al. ............. | 526/340 |
| 5,496,940 | 3/1996 | Lawson et al. ....................... | 540/450 |
| 5,508,333 | 4/1996 | Shimizu ................................. | 524/424 |
| 5,659,056 | 8/1997 | Hergenrother et al. ............. | 556/401 |
| 5,686,523 | 11/1997 | Chen et al. ........................... | 524/547 |
| 5,717,022 | 2/1998 | Beckmann et al. .................. | 524/493 |
| 5,780,538 | 7/1998 | Cohen et al. ........................ | 524/494 |
| 5,811,479 | 9/1998 | Labauze ................................. | 524/188 |
| 5,821,290 | 10/1998 | Labauze ................................. | 524/188 |
| 5,866,171 | 2/1999 | Kata ....................................... | 425/46 |
| 5,876,527 | 3/1999 | Tsuruta et al. ...................... | 152/541 |
| 5,914,364 | 6/1999 | Cohen et al. ........................ | 524/494 |
| 5,925,713 | 6/1999 | Labauze ................................. | 524/572 |
| 5,931,211 | 8/1999 | Tamura ................................. | 152/209.5 |
| 5,965,272 * | 10/1999 | Donnelly ............................... | 428/447 |
| 5,971,046 | 10/1999 | Koch et al. ......................... | 525/152.1 |
| 5,977,238 | 11/1999 | Labauze ................................. | 524/492 |
| 6,008,295 | 12/1999 | Takeichi et al. ..................... | 525/105 |
| 6,013,718 | 1/2000 | Cabioch et al. ..................... | 524/506 |
| 6,057,392 | 5/2000 | Wideman et al. .................... | 524/318 |

FOREIGN PATENT DOCUMENTS

| | | |
|---|---|---|
| 2177095 | 11/1996 | (CA) . |
| 2242310 | 1/1999 | (CA) . |
| 2242801 | 1/1999 | (CA) . |
| 2243091 | 1/1999 | (CA) . |
| 0 641 824 | 3/1995 | (EP) . |
| 0 761 734 | 3/1997 | (EP) . |
| 0 801 112 | 10/1997 | (EP) . |
| 0 824 131 | 2/1998 | (EP) . |
| 0 890 603 | 1/1999 | (EP) . |
| 0 890 606 | 1/1999 | (EP) . |
| 1 031 604 | 8/2000 | (EP) . |
| 1 061 097 | 12/2000 | (EP) . |
| 11 181161 | 7/1999 | (JP) . |

* cited by examiner

Primary Examiner—Paul R. Michl
(74) Attorney, Agent, or Firm—John H. Hornickel; Barbara Arndt

(57) ABSTRACT

A vulcanizable elastomeric composition comprises a moisture stabilized polymer, a reinforcing filler comprising silica, a processing aid, and a cure agent comprising an effective amount of sulfur to achieve a satisfactory cure of the composition. The moisture stabilized polymer comprises the hydrolysis reaction product of a hydrolyzable substituent of an alkoxysilane terminated polymer reacted with a viscosity stabilizing effective amount of a viscosity stabilizing agent comprising a first long chain alcohol, prior to contacting the polymer with water. The processing aid is a second long chain alcohol, an alkyl alkoxysilane, or a mixture thereof.

24 Claims, No Drawings

SILICA-REINFORCED RUBBER COMPOUNDS CONTAINING MOISTURE STABILIZED POLYMERS

FIELD OF THE INVENTION

The invention generally relates to vulcanizable elastomeric compounds containing silica as a reinforcing filler.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, elastic modulus, tangent delta (tan δ), and the like. Rubber articles, especially tires, produced from vulcanized elastomers exhibiting these improved properties will have reduced hysteresis, better rolling resistance, snow and ice traction, wet traction, and improved fuel economy for vehicles equipped with such tires. Traditionally, improved dispersion of reinforcing fillers has been accomplished by lengthened mixing times. However, in commercial applications, prolonged mixing times result in decreased production and increased expense.

With the increasing use of silica as a reinforcing filler for rubber, filler dispersion in rubber stocks has become a major concern. Because polar silanol groups on the surface of silica particles tend to self-associate, reagglomeration (flocculation) of silica particles occurs after compounding, leading to poor silica dispersion and a high compound viscosity. Therefore, it is desirable to improve the dispersion of silica in rubber compounds, especially when used for tire treads, to improve performance characteristics.

Previous attempts at preparing readily processable, vulcanizable silica-filled rubber stocks containing natural rubber or diene polymer and copolymer elastomers have focused on the use, during compounding, of bifunctional silica coupling agents having a moiety (e.g., an alkoxysilane group) reactive with the silica surface, and a moiety (e.g., a mercapto, amino, vinyl, epoxy or sulfur group) that binds to the elastomer. Well known examples of such silica coupling agents are mercaptosilanes and bis-trialkoxysilylorgano polysulfides, such as bis-(3-triethoxysilylpropyl) tetrasulfide which is sold commercially as Si69 by Degussa. With the coupling agent acting as an intermediary, the compound viscosity is reduced and the silica particles are more easily dispersed into the elastomeric matrix. However, such bifunctional silica coupling agents are expensive. In addition, the reaction of the alkoxy portion of the coupling agent with the silica can result in the release of a substantial amount of alcohol, resulting in a rubber compound containing undesirable bubbles that can form blisters or surface defects in the resulting formed rubber articles.

To address the expense and other problems related to bifunctional silica coupling agents, recent approaches to providing improved dispersion of silica in rubber compounds have been directed to reducing or replacing the use of such silica coupling agents by employing dispersing agents, such as monofunctional silica processing aids (e.g. silica hydrophobating agents that chemically react with the surface silanol groups on the silica particles but are not reactive with the elastomer) and agents which physically shield the silanol groups to prevent reagglomeration of the silica particles after compounding. For example, dispersing agents, such as alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, and fillers such as mica, talc, urea, clay, sodium sulfate, and the like, are the subjects of co-owned EP 0890606 and EP 0890603. Such silica dispersing agents can be used to replace all or part of expensive bifunctional silica coupling agents, while improving the processability of silica-filled rubber compounds by reducing the compound viscosity, increasing the scorch time, and reducing silica reagglomeration. The use of such dispersing aids includes employing an increased amount of sulfur, to replace sulfur that otherwise would have been supplied by a sulfur-containing silica coupling agent, in order to achieve a satisfactory cure of the rubber compound.

Another approach to improving dispersion of silica filler, involves modification of polymer chains with functional end groups that interact with or shield the surface hydroxyl groups on the silica filler. In particular, alkoxysilane terminated polymers have a carbon-silicon bond and at least one terminal —SiOR group that reacts with the silica surface, forming an Si—O—Si linkage. Although alkoxysilane terminated polymers have provided adequate dispersion of reinforcing fillers during compounding, there has been a problem with stabilizing the Mooney viscosity of the gum polymer prior to compounding. In particular, polymers produced by solution polymerization in inert organic solvents, such as hexane, require a desolventization step after polymerization. Although desolventization can be achieved by drum-drying, in commercial practice desolventization is achieved through the use of either steam or heated water. When the polymer chains are terminated by alkoxysilane compounds, hydrolysis of pendant —SiOR end groups during the desolventization step, leads to coupling of the polymer chains via formation of —Si—O—Si— bonds between two or more alkoxysilane end groups, resulting in a large increase in the polymer molecular weight and, concomitantly, a large increase in the Mooney viscosity of the gum polymer. Moreover, during storage of alkoxysilane terminated polymers for a period of time prior to compounding, humid environmental conditions and residual water from desolventization can lead to further hydrolysis of end groups and polymer chain coupling, and a further increase in viscosity.

Several approaches have been taken to overcome this hydrolysis and coupling problem. For example, acids such as $C_1$ to $C_{12}$ aliphatic and $C_6$ to $C_{12}$ cycloaliphatic and aromatic carboxylic acids have been employed as viscosity stabilizing agents to treat the polymer prior to desolventization. The acids do not react with the alkoxysilane terminal end groups of the polymer, but rather neutralize the by-product lithium compounds in admixture with the polymer, thereby slowing the rate of formation of low boiling alcohols during desolventization, slowing the rate of the hydrolysis reaction and, therefore, slowing the rate of coupling of the polymer.

Other approaches to controlling the Mooney viscosity of such alkoxysilane-terminated polymers have included the use of alkyl alkoxysilanes, as viscosity stabilizing agents prior to desolventization of the polymer. These agents react with the alkoxysilane terminated polymers by adding a long chain alkyl group to the alkoxy terminal and eliminate, rather than just slow down, any increase in the Mooney viscosity for a period of time.

Another approach to stabilizing the Mooney viscosity of alkoxysilane terminated polymers, involves exchanging the alcohol of the alkoxysilane terminal group with a long chain alcohol, such as an aliphatic, cycloaliphatic, or aromatic alcohol, or a fatty acid ester of a hydrogenated or non-hydrogenated $C_5$ or $C_6$ sugar. The presence of the long chain alcohol or fatty acid ester sterically inhibits the availability of the hydrolyzable bond(s) to moisture. This approach results in slowing of the rate of coupling of the polymer which, in turn, slows the foreseen increase in Mooney viscosity of the alkoxysilane terminated polymer.

SUMMARY OF THE INVENTION

The present invention employs moisture stabilized polymers, such as those described above, in compositions with silica or a mixture of silica and carbon black and a silica dispersing processing aid, to produce vulcanized elastomeric compounds having improved physical properties. In particular, the invention provides silica-reinforced vulcanizable elastomeric compounds comprising alkoxysilane terminated polymers that have been moisture stabilized by reacting the alkoxysilane terminal group with an effective amount of a long chain alcohol serving as a viscosity stabilizing agent after polymerization but prior to desolventization. Representative of such polymers are the subject of co-owned copending U.S. patent application Ser. No. 09/449,303, the disclosure of which is hereby incorporated by reference.

It has been unexpectedly discovered that the combination of viscosity stabilizing agent present in the polymer and the silica dispersing processing aid used in the compounding process results in vulcanized elastomeric compounds having improved silica dispersion, decreased silica flocculation after compounding, improved dynamic viscoelastic properties indicative of reduced hysteresis and rolling resistance, improved wet traction and snow and ice traction.

According to the present invention, a vulcanizable elastomeric composition comprises a moisture stabilized polymer, a reinforcing filler comprising silica or a mixture thereof with carbon black, a processing aid, and a cure agent comprising an effective amount of sulfur to achieve a satisfactory cure of the composition. The moisture stabilized polymer comprises the hydrolysis reaction product of a hydrolyzable substituent of an alkoxysilane terminated polymer reacted with a viscosity stabilizing effective amount of a viscosity stabilizing agent comprising a first long chain alcohol, prior to contacting the polymer with water. The effective amount of the viscosity stabilizing agent is about one to about 50 mole equivalents, preferably about one to about 20 mole equivalents, more preferably about one to about 5 mole equivalents, and especially one mole equivalent of the stabilizing agent per each mole equivalent of anionic initiator used in the polymerization of the alkoxysilane terminated polymer.

The processing aid is selected from the group consisting of a second long chain alcohol, an alkyl alkoxysilane, and a mixture thereof. The processing aid can be fully or partially supported on the reinforcing filler.

In one embodiment of the invention, the moisture stabilized polymer in the composition contains the viscosity stabilizing agent in an amount of "m" phr (parts by weight per hundred parts rubber), the processing aid is present in an amount of "n" phr, based on the weight of the silica, and the sum m+n is about one to about 15 phr. Preferably, m+n is 0.1% to 150% by weight of the silica.

The viscosity stabilizing agent is preferably selected from the group consisting of aliphatic, cycloaliphatic, and aromatic alcohols having more carbon atoms than the hydrolyzable substituent. The viscosity stabilizing agent and the processing aid can both be long chain alcohols and are independently selected from the group consisting of aliphatic, cycloaliphatic, and aromatic alcohols having at least six carbon atoms, multi-hydroxy fatty acid esters of hydrogenated and non-hydrogenated $C_5$ and $C_6$ sugars, polyoxyethylene derivatives of multi-hydroxy fatty acid esters of hydrogenated and non-hydrogenated $C_5$ and $C_6$ sugars, and mixtures thereof Preferably, the fatty acid esters are selected from the group consisting of sorbitan fatty acid esters, such as sorbitan monooleate.

In another embodiment, the processing aid is selected from alkyl alkoxysilanes having the formula $R^2_p Si(OR^3)_{4-p}$ where p is an integer from 1 to 3. The alkoxy groups are the same or different from each other, and each $R^3$ independently comprises $C_1$ to about $C_6$. Each $R^2$ independently comprises $C_1$ to about $C_{20}$ aliphatic, about $C_5$ to about $C_{20}$ cycloaliphatic, or about $C_6$ to about $C_{20}$ aromatic. Preferably, the alkyl alkoxysilane is selected from the group consisting of alkyl trialkoxysilanes.

The invention also provides a method for preparing the vulcanized elastomeric compound. The method comprises the steps of 1) mixing together, in a mixer, the moisture stabilized polymer, the reinforcing filler, the processing aid and the cure agent, and 2) effecting vulcanization.

The invention also provides a pneumatic tire having at least one component produced from the vulcanized elastomeric composition. The sulfur-vulcanized elastomeric compounds of the invention possess favorable viscoelastic properties that are indicators of improved snow, ice and wet traction, improved rolling resistance, improved abrasion resistance, and reduced hysteresis, when the vulcanized compounds are incorporated into tire treads.

DETAILED DESCRIPTION OF THE INVENTION

Polymers suitable for use in the vulcanizable elastomeric compositions of the invention are described, for example, in co-owned copending U.S. patent application Ser. No. 09/449,303. As used herein, the terms "alkoxysilane terminated" polymer or "alkoxysilane functionalized" polymer mean a polymer having an alkoxysilane end group formed by reacting the living end of an anionically polymerized polymer with an alkoxysilane functionalizing agent, such as tetraethoxysilane ($Si(OEt)_4$), or methyltriphenoxysilane ($MeSi(OPh)_3$), or the like, to terminate polymerization. While still in an inert solvent prior to desolventization, the alkoxysilane terminated polymer, having a hydrolyzable constituent, is then reacted with a long chain alcohol, as described below, to provide a long carbon chain that sterically hinders the availability of the hydrolyzable bond to moisture. Such polymers are described herein as moisture stabilized polymers. An exemplary hydrolyzable group is a pendant —SiOR group, wherein R is an alkyl, cycloalkyl, or aromatic group capable of reacting with a similar pendant —SiOR group to form an Si—O—Si bond.

The moisture stabilized polymers suitable for use in the vulcanizable elastomeric composition of the present invention can be any anionically solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g. styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about 4 to about 12 carbon atoms. Exemplary vinyl aromatic copolymers are those prepared from monomers having from about 8 to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the preferred polymers, copolymers or terpolymers having 1,2-microstructure content of from about 25 to 65 percent, based upon the diene content. The elastomeric copolymers are preferably random copolymers which result from simultaneous copolymerization of the monomers A and B with randomizing agents, as is known in the art.

Preferred polymers for use in a vulcanizable elastomeric composition of the invention include, but are not limited to, polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin-lithium, organo-lithium, cycloalkylimido-lithium, and dialkylimido-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about 8 carbon atoms. Although the hydrocarbyl group is preferably an aliphatic group, the hydrocarbyl group can also be cycloaliphatic or aromatic. The aliphatic group can be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. The preferred organo-lithium initiators are n-butyl lithium, tributyl tin lithium and "in situ" produced lithium hexamethyleneimide initiator prepared by reacting hexamethyleneimine and n-butyl lithium (described in co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. Various techniques for polymerization, such as batch, semi-batch and continuous polymerization, can be employed.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2'-di(tetrahydrofuryl) propane, dipiperidyl ethane, hexamethyl phosphoramide, N-N'-dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is preferred to maintain the peak temperature at from about 50° C. to about 150° C. and, more preferably, from about 60° C. to about 100° C. Polymerization is allowed to continue under agitation for about 0.15 hours to 24 hours.

After polymerization is complete, the polymer chains can be terminated with an alkoxysilane functionalizing agent, such as tetraethoxysilane (Si(OEt)$_4$), methyl triphenoxysilane (MeSi(OPh)$_3$), or the like, as is well known to those of ordinary skill in the art. The alkoxysilane reagent reacts with the living end of the polymer to produce an alkoxysilane end group. Exemplary alkoxysilane terminated polymers are represented by the following structural formula

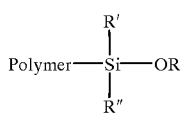

wherein R is a $C_1$–$C_{18}$ alkyl, $C_4$–$C_8$ cycloalkyl or $C_6$–$C_{18}$ aromatic group, and R' and R" can be the same or different from each other and are selected from the group consisting of alkoxy, a $C_1$–$C_{18}$ alkyl, $C_4$–$C_8$ cycloalkyl or $C_6$–$C_{18}$ aromatic group.

Prior to terminating the polymerization reaction with the alkoxysilane functionalizing agent, a coupling agent can be added to the polymerization reaction to couple at least some of the polymer chains together and increase the Mooney viscosity of the polymer mixture to a desired range. For example, useful coupling agents can include those of the structural formula $(R)_aZX_b$, where Z is tin or silicon. It is preferred that Z is tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride. Preferably, tin coupling agents, such as tin tetrachloride, are employed, and can be added in varying amounts, typically in amounts of 0 to about 0.9 mole equivalents per each mole equivalent of anionic initiator depending upon the desired Mooney viscosity of the polymer. The practice of the present invention is not limited solely to the above described alkoxysilane functionalizing agents, coupling agents, and the like, since other compounds that are reactive with the polymer bound carbon-lithium moiety can be selected to provide a desired functional group.

Optionally, upon termination, the alkoxysilane terminated polymer would then be coagulated and quenched, if necessary, dried, and/or then undergo desolventization. Quenching can be conducted, if necessary, by contacting the alkoxysilane terminated polymer with a quenching agent for about 0.01 to about 1.0 hours at temperatures of from about 20° C. to about 120° C. to ensure a complete reaction. Suitable quenching agents include carboxylic acids such as 2-ethyl hexanoic acid (EHA), acetic acid and the like. Coagulation is typically done with alcohols such as methanol or isopropanol. Lastly, the solvent is removed from the polymer by conventional techniques such as drum drying, extruder drying, vacuum drying or the like, which can be combined with coagulation with water, alcohol or steam. If coagulation with water or steam is used, oven drying can be desirable.

However, unless hydrolysis of the —SiOR group is inhibited or prevented, alkoxysilane terminated polymers are subject to a hydrolysis reaction in the presence of moisture due to steam desolventization or storage in humid environmental conditions, as illustrated in Reactions I and II below, leading to an undesirable increase in the Mooney viscosity of the polymers. Reaction I is well known in the art and typically leads to the coupling of alkoxysilane terminated polymers through the subsequent formation of Si—O—Si bonds, as in Reaction II.

(Reaction I)

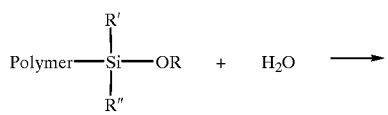

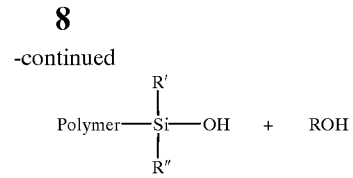

Reaction II)

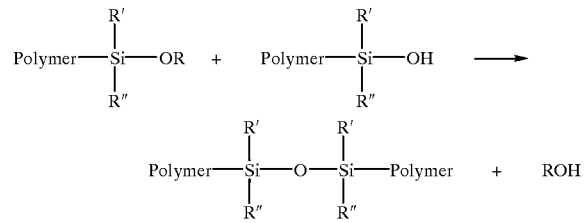

To obtain moisture stabilized polymers for use in the present invention, prior to quenching or removing the solvent the alkoxysilane terminated polymers are reacted with a long chain alcohol ($R^1OH$) to obtain a different more hydrolytically stable (i.e., hydrophobic) terminal —SiOR group, as illustrated in Reaction III. $R^1$ is a moiety having more carbon atoms than are present in the hydrolizable substituent (R) of the pendant —SiOR group of the alkoxysilane terminated polymer. Preferably, $R^1$ includes at least six carbon atoms.

(Reaction III)

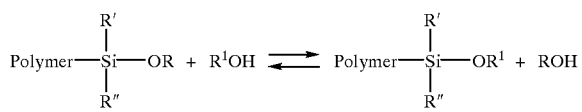

Hence, a new moisture stabilized polymer is produced. This reaction is advantageous, because the substituent $R^1$ will always be larger or longer, i.e., have more carbon atoms, than the original hydrolyzable substituent, R, which typically will have between 1 and 5 carbon atoms. However, where a larger R moiety is used, it will be appreciated that $R^1$ will, in turn, also use a larger moiety containing more carbon atoms than does the R moiety.

Having undergone the reaction set forth above, the moisture stabilized polymer is much less susceptible to hydrolysis and the accompanying increase in Mooney viscosity due to coupling of the hydrolyzable alkoxysilane end groups on the polymers. The longer and more complex the hydrolyzable substituent is, the more difficult it is for the hydrolysis reaction to occur. Thus, upon aging, there will be only a slow increase in Mooney viscosity. The ability of the polymers to form Si—O—Si bonds between the polymers is significantly reduced by the addition of long chain, high boiling alcohols.

Reaction III is an equilibrium state, and a finite amount of unbound $R^1OH$ remains within the gum polymer in the vulcanizable elastomeric compounds of the invention. The total concentration of unbound and polymer-bound $R^1OH$ is "m" phr, parts by weight per hundred parts gum polymer.

Reaction IV, below, illustrates a preferred embodiment of Reaction III, in which the functional group —OR is ethoxy (—OEt) and the alcohol $R^1OH$ is sorbitan monooleate (SMO) in the alcohol form, SMOH. The alkoxy group $OR^1$ is a sorbitan monooleate moiety, i.e., SMOH with a hydroxyl hydrogen removed and the corresponding hydroxyl oxygen bonded to the Si. The reaction produces ethanol (EtOH).

Reaction IV is an equilibrium state, and a finite amount of unbound sorbitan monooleate remains within the gum polymer in the vulcanizable elastomeric compound of the invention. The total concentration of unbound and polymer-bound sorbitan monooleate is "m" phr.
(Reaction IV)

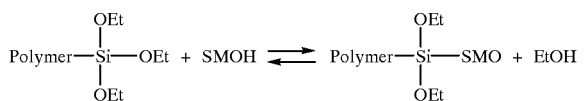

The amount of the viscosity stabilizing agent added in the polymerization stage is designated "m" phr, based on the following calculation The weight of the monomers in the polymerization is known, and the weight of the viscosity stabilizing agent is known. Therefore, assuming complete conversion of monomer to polymer, $$\frac{(mM \text{ of } VSA) \times (MW \text{ of } VSA) \times 100}{\text{weight of monomers}} = \frac{\text{grams } VSA}{100\text{g polymer}}$$

where VSA is viscosity stabilizing agent, mM is millimoles, and MW is molecular weight.

With reference to Reaction III, essentially any long chain alcohol compatible with the polymer can be employed as a viscosity stabilizing agent. To be compatible, the alcohol should be at least partially soluble in the inert solvent and the rubber polymer, and capable of interacting with the —SiOR group of the alkoxysilane terminated polymer. Essentially any high boiling alcohol will be compatible. For purposes of this disclosure, a "high boiling alcohol" is one having a boiling point higher than that of ethanol. Preferably, essentially any monohydric or polyhydric alcohol that would not be readily removed by azeotroping with water is suitable for use. That is, the alcohol should be capable of reacting with the alkoxysilane termination on the polymer such that a new, longer and more hydrolytically stable hydrolyzable substituent can be formed on the alkoxysilane end groups. Generally, the longer or more complex the substituent, the more hydrolytically stable the polymer will be. Reacting the polymer with an alcohol which will not significantly azeotrope with water during steam desolventization will, in turn, result in a polymer which is less likely to couple to itself, thereby slowing and stabilizing the increase in Mooney viscosity of the alkoxysilane terminated polymer.

During the polymerization stage, the long chain alcohols of the present invention can be employed in varying amounts depending upon the number of alkoxysilane-termination functionalities present in the polymer. The effective amount of the alcohol is about one to about 50 mole equivalents, preferably about one to about 20 mole equivalents, more preferably about one to about 5 mole equivalents, and especially one mole equivalent of the stabilizing agent per each mole equivalent of anionic initiator used in the polymerization of the alkoxysilane terminated polymer. Depending upon the process utilized in the drying and/or desolventization process, additional alcohol can be used.

The long chain alcohols used as viscosity stabilizing agents are the same as those suitable for use as silica dispersing processing aids described below, and are selected from the group consisting of 1) aliphatic, cycloaliphatic, and aromatic alcohols, having at least six carbon atoms, 2) fatty acid esters of hydrogenated and non-hydrogenated $C_5$ and $C_6$ sugars, e.g., sorbitose, mannitose, and arabinose, and 3) polyoxyethylene derivatives of those fatty acid esters of $C_5$ and $C_6$ sugars. Branched structures are preferred. A preferred aliphatic alcohol is 2-ethylhexyl alcohol.

With respect to the fatty acid esters of hydrogenated and non-hydrogenated $C_5$ and $C_6$ sugars, these compounds have at least three hydroxyl groups and from one to 3.5 ester groups (sesqui esters). The esterified hydrogenated and non-hydrogenated sugars can be described generally by the following formula using sorbitol as the representative ester

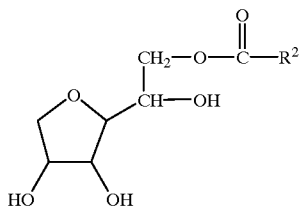

where $R^2$ is derived from $C_{10}$ to $C_{22}$ saturated and unsaturated fatty acids, for example, stearic, lauric, palmitic, oleic, and the like.

Representative examples include, but are limited to, sorbitan oleates, including monooleate, dioleate, trioleate, and sesquioleate, as well as sorbitan esters of laurate, palmitate, and stearate fatty acids, and derivatives thereof, as well as other polyols including glycols, such as polyhydroxy compounds and the like. Of these, sorbitan oleates are preferred, with sorbitan monooleate being most preferred. In similar fashion, other esters can be formed with mannitose and arabinose. For example, fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO, Capmul® O, Glycomul® O, Arlacel® 80, Emsorb® 2500, and S-Maz® 80. Generally, a useful amount to serve as a processing aid is about 0.1% to about 60% by weight based on the weight of the silica, with about 0.5% to about 50% by weight being preferred, and about 1% to about 30% by weight based on the weight of the silica being more preferred.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate 80, Tween® 80, Emsorb® 6900, Liposorb® O-20, T-Maz® 80, POE® (20) sorbitan monooleate Polysorbate® 80, Tween® 80, Emsorb® 6900, Liposorb® O-20, T-Maz® 80, and the like. The Tween® products are commercially available from ICI Specialty Chemicals. Generally, a useful amount to serve as a processing aid is about 0.1% to about 60% by weight based on the weight of the silica, with about 0.5% to about 50% by weight being preferred, and about 1% to about 30% by weight based on the weight of the silica being more preferred.

Vulcanizable elastomeric compositions of the invention are prepared by mixing a moisture stabilized polymer, prepared with a viscosity stabilizing agent as described above, with a reinforcing filler comprising silica or a mixture of silica and carbon black, a processing aid, a cure agent and an effective amount of sulfur to achieve a satisfactory cure of the composition. According to the present invention, at least one processing aid used in the compounding stage is a long chain alcohol or an alkyl alkoxysilane, and can be the same or different from the viscosity stabilizing agent. The long chain alcohol processing aid is selected from the same group of alcohols $R^1OH$ described above for use as a viscosity stabilizing agent.

The alkyl alkoxysilane processing aid is selected from alkyl alkoxysilanes having the formula $$R^2_p Si(OR^3)_{4-p}$$

wherein the alkoxy groups are the same or different from each other, each $R^2$ independently comprises $C_1$ to about $C_{20}$ aliphatic, about $C_5$ to about $C_{20}$ cycloaliphatic, or about $C_6$ to about $C_{20}$ aromatic, and each $R^3$ independently comprises $C_1$ to about $C_6$, and p is an integer from 1 to 3. Preferably, the alkyl alkoxysilane is selected from the group consisting of alkyl trialkoxysilanes.

Exemplary alkyl alkoxysilanes include, but are not limited to, octyl triethoxysilane, octyl trimethoxysilane, trimethyl ethoxysilane, cyclohexyl triethoxysilane, iso-butyl triethoxysilane, ethyl trimethoxysilane, hexyl tributoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyl octyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyl octyl dimethoxysilane, and mixtures thereof. Preferred alkyl alkoxysilane processing aids are octyl triethoxysilane, octadecyl triethoxysilane, and nonyl triethoxysilane.

In a preferred embodiment, the polymer contains "m" phr of the viscosity stabilizing agent incorporated in the polymerization stage, and "n" phr of the processing aid is added during compounding stage, such that the sum m+n equals a predetermined value that is based on the weight of the silica. Preferably, m+n is about one to about 15 phr. Additionally, m+n is 0.1% to 150% by weight of the silica.

The concentration "m" of viscosity stabilizing agent to add during polymerization can be determined as a function of polymerization considerations alone, such as the choice and concentration of polymerization reactants and the polymer end product desired. The concentration "m" can be determined independently of compounding parameters. In contrast, the total value "m+n" is substantially determined as a function of the silica concentration in compounding, and, to a lesser extent, other compounding-related parameters. Then, the concentration, "n" is calculated as the difference between "m" and "m+n". Therefore, a single gum polymer, polymerized with a specific concentration "m", can be used later with different compounds having widely varied silica content. This is possible, because the aforementioned method of calculating "n" takes into account both the concentration of silica incorporated in the compounding stage and the amount of long chain alcohol incorporated in the polymerization stage.

The preferred moisture stabilized conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Examples of reinforcing silica fillers which can be used in the vulcanizable elastomeric composition of the invention include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 100 parts per hundred parts of the elastomer, preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP), and J. M. Huber Corporation.

The elastomers can be compounded with all forms of carbon black in a mixture with the silica. The carbon black can be present in amounts ranging from about one to about 50 phr, with about five to about 35 phr being preferred. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethylammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

Certain additional fillers can be utilized according to the present invention as processing aids, including mineral fillers, such as clay (hydrous aluminum silicate), talc (hydrous magnesium silicate), aluminum hydrate [$Al(OH)_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the alcohol processing aid, as well as any additional processing aids described above. As with the support of the processing aid on the reinforcing filler, as described above, the ratio of processing aid to non-reinforcing filler is not critical. For example, the ratio can be about 1/99 to about 70/30, about 20/80 about 60/40, about 50/50, and the like.

The alcohol and/or alkyl alkoxysilane processing aids described above can be fully or partially supported by the reinforcing filler and/or the additional filler. The ratio of the processing agent to the filler is not critical. If the processing aid is a liquid, a suitable ratio of processing aid to filler is that which results in a suitably dry material for addition to the elastomer. For example, the ratio can be about 1/99 to about 70/30, about 20/80 about 60/40, about 50/50, and the like.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are know those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about two to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 5 phr, with a range of about 1.5 to about 3.5 phr being most preferred.

When a sulfur-containing silica coupling agent is absent or reduced in concentration, an appropriate adjustment in the amount of sulfur added to the elastomeric composition is necessary to achieve a satisfactory cure of the composition. For example, an effective amount of sulfur in an invention composition would provide a property of the cured compound that is approximately equal to the same property of a satisfactorily cured compound containing Si69 with a conventional amount of sulfur. Exemplary cured properties for comparison include, but are not limited to, the value of the 300% Modulus (psi), the molecular weight between crosslinks (Mc g/mol), and the like, and other cured properties that are well known to those skilled in the art of rubber making. The increased amount of sulfur to compensate for the reduced availability of sulfur from a sulfur-donating silica coupling agent will vary from composition to composition, depending on the amount of silica and the amount, if any, of a sulfur-donating silica coupling agent present in the formulation. Based on the disclosure contained herein, and in the examples of invention compositions described below, one skilled in the art of rubber compounding can easily determine the effective amount of sulfur required for a satisfactory cure of the compound without undue experimentation. The additional sulfur can take any form, including soluble sulfur, insoluble sulfur, or any of the sulfur-donating compounds described as vulcanizing agents below, or mixtures of the foregoing.

The vulcanizable elastomeric composition of the present invention can be obtained by milling the components by using a milling apparatus, such as a mill, an internal mixer, and the like for a sufficient time and at a high enough temperature to achieve the desired physical properties of the resulting compound. The mixing of the vulcanizable elastomeric composition can be accomplished by methods known to those having skill in the rubber mixing art. For example, the ingredients can be mixed in two or more stages, consisting of at least a "master batch" stage (comprising mixing of the elastomer, with at least a portion of the silica and/or carbon black and other ingredients); and a "final stage", in which the cure agents are typically added. There can also be a mixing stage in which the mixture is re-milled without the addition of ingredients. The alcohol and/or alkyl alkoxysilane processing aid can be added in any one or multiple stage(s) of the mixing process.

The mixing temperature can vary from stage to stage. For purposes of the invention, the mixing of the alcohol and/or alkyl alkoxysilane and the silica filler can take place at a mixing temperature of about 60° C. to about 200° C., typically 90° C. to about 190° C. and, more preferably, about 120° C. to about 180° C. The composition is cured at a temperature of about 140° to about 190° C. for about 5 minutes to about 120 minutes.

The elastomeric compositions of the invention, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. No. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

EXAMPLES

The following examples illustrate the methods for preparation of the sulfur-vulcanizable elastomeric compositions of the present invention. However, the examples are not intended to be limiting, as other methods for preparing these compositions and different compounding formulations can be determined by those skilled in the art, according to the disclosure made hereinabove. Thus, the invention is not limited to the specific elastomers, silica, carbon black, silica dispersing processing aids, or other compound ingredients disclosed, nor to any particular amount of an ingredient in the composition. Moreover, the invention is not limited to the specified mixing times or temperatures, or to the stage in which the particular ingredients are added to the mixer. The examples have been provided merely to demonstrate the practice of the subject invention and do not constitute limitations of the invention. Thus, it is believed that any of the variables disclosed herein can readily be determined and controlled without departing from the scope of the invention herein disclosed and described.

In order to demonstrate the methods of preparation and properties of the vulcanizable elastomeric compositions for the invention, five stocks of rubbers were prepared: Controls A and B, and Stocks 1, 2 and 3. The procedure for producing each gum polymer used in each stock is described below. In each procedure, the exemplary styrene-butadiene rubber (SBR) was prepared under anhydrous and anaerobic conditions in a jacketed, stainless steel reactor fit with a stirrer.

Example 1

Synthesis of Alkoxysilane Terminated SBR, Sorbitan Monooleate (SMO) Treated, SMO:BuLi=5:1, Stock 1

To a two gallon reactor was charged 0.09 kg hexane, 0.83 kg of 33.0 percent by weight styrene in hexane, and 3.58 kg of 21.7 percent by weight butadiene in hexane. Then 1.26 ml of 0.6M potassium t-butylamylate in hexane, 2.84 ml of 3.54 M hexamethyleneimine in cyclohexane, 0.55 ml of 1.6 M 2-2-di(tetrahydrofuryl) propane in hexane, and 7.86 ml of 1.6M n-butyl lithium in hexane were charged into the reactor, and the jacket temperature was raised to 46.1° C.

After 140 minutes, 4.40 ml of 0.25 M tin tetrachloride in hexane was added to the reactor. After 15 minutes, 5.66 ml of 1.00 M tetraethoxysilane in hexane was added to the reactor. After 15 minutes, 62.87 ml of 1M sorbitan monooleate in hexane was added to the reactor. The polymer cement was then removed from the reactor and coagulated with isopropanol in the presence of antioxidant di-t-butyl-p-cresol (DBPC) and drum dried.

The dried polymer had the following properties: $ML_{1+4}$ (100° C.)=32.9; weight % styrene=26.9; weight % block styrene=11.1; weight % 1,2-butadiene=23.4; weight % 1,4-butadiene=49.7; Tg=−48.3° C.; weight average molecular weight $1.87 \times 10^5$; number average molecular weight $1.22 \times 10^5$.

Example 2

Synthesis of Alkoxysilane Terminated SBR, SMO Treated, SMO:BuLi=5:1, Stock 2

This stock was prepared similarly to stock 1, except that EHA was added to neutralize the polymer to reduce hydrolysis and subsequent chain coupling. To a two gallon reactor was charged 0.04 kg hexane, 0.83 kg of 33.0 percent by weight styrene in hexane, and 3.63 kg of 21.4 percent by weight butadiene in hexane. Then 1.26 ml of 0.6M potassium t-butylamylate in hexane, 2.84 ml of 3.54 M hexamethyleneimine in cyclohexane, 0.55 ml of 1.6 M 2-2-di(tetrahydrofuryl) propane in hexane, and 7.86 ml of 1.6M n-butyl lithium in hexane were charged into the reactor, and the jacket temperature was raised to 46.1° C.

After 180 minutes, 4.40 ml of 0.25 M tin tetrachloride in hexane was added to the reactor. After 15 minutes, 5.66 ml of 1.00 M tetraethoxysilane in hexane was added to the reactor. After 15 minutes, 13.33 ml of 1M 2-ethylhexanoic acid (EHA) in hexane and 62.87 ml of 1M sorbitan monooleate in hexane were added to the reactor. The polymer cement was then removed from the reactor and coagulated with isopropanol in the presence of antioxidant DBPC and drum dried. The fresh stock is designated "Stock 2".

The dried polymer had the following properties: $ML_{1+4}$ (100° C.)=32.9; weight % styrene=27.2; weight % block styrene=11.5; weight % 1,2-butadiene=19.0; weight % 1,4-butadiene=53.8; Tg=−52.5° C.; weight average molecular weight $2.34 \times 10^5$; number average molecular weight $1.16 \times 10^5$.

Example 3

Synthesis of Alkoxysilane Terminated SBR, SMO Treated, SMO:BuLi=1:1, Stock 3

This stock was prepared similarly to stocks 2 except for the amount of SMO. To a two gallon reactor was charged 0.09 kg hexane, 0.83 kg of 33.0 percent by weight styrene in hexane, and 3.58 kg of 21.7 percent by weight butadiene in hexane. Then 1.26 ml of 0.6M potassium t-butylamylate in hexane, 2.84 ml of 3.54 M hexamethyleneimine in cyclohexane, 0.55 ml of 1.6 M 2-2-di(tetrahydrofuryl) propane in hexane, and 7.86 ml of 1.6M n-butyl lithium in hexane were charged into the reactor, and the jacket temperature was raised to 46.1° C.

After 180 minutes, 4.40 ml of 0.25 M tin tetrachloride in hexane was added to the reactor. After 15 minutes, 5.66 ml of 1.00 M tetraethoxysilane in hexane was added to the reactor. After 15 minutes, 12.57 ml of 1M 2-ethylhexanoic acid (EHA) in hexane and 12.57 ml of 1M sorbitan monooleate in hexane were added to the reactor. The polymer cement was then removed from the reactor and coagulated with isopropanol in the presence of antioxidant DBPC and drum dried.

The dried polymer had the following properties: $ML_{1+4}$ (100° C.)=34.0; weight % styrene=27.9; weight % block styrene=10.9; weight % 1,2-butadiene=20.0; weight % 1,4-butadiene=52.1; Tg=−50.0° C.; weight average molecular weight $2.27 \times 10^5$; number average molecular weight $1.11 \times 10^5$.

Example 4
Synthesis of Aloxysilane Terminated SBR, Comparative Examples

To a two gallon reactor was charged 0.09 kilograms (kg) hexane, 0.83 kg of 33.0 percent by weight styrene in hexane, and 3.58 kg of 21.7 percent by weight butadiene in hexane. Then 1.26 milliliters (ml) of 0.6 molar (M) potassium t-butylamylate in hexane, 2.84 ml of 3.54 M hexamethyleneimine in cyclohexane, 0.55 ml of 1.6 M 2-2-di (tetrahydrofuryl) propane in hexane, and 7.86 ml of 1.6 M n-butyl lithium were charged into the reactor, and the jacket temperature was raised to 46.1° C.

After 90 minutes, 4.40 ml of 0.25 M tin tetrachloride in hexane was added to the reactor. After 20 minutes, 5.66 ml of 1.00 M tetraethoxysilane in hexane was added to the reactor. After 15 minutes, 13.33 ml of 2-ethylhexanoic acid (EHA) was added to the reactor. The polymer cement was then removed from the reactor and coagulated with isopropanol in the presence of antioxidant DBPC and drum dried.

The dried polymer had the following properties: $ML_{1+4}$ (100° C.)=42.0; weight % styrene=22.5; weight % block styrene=10.6; weight % 1,2-butadiene=22.8; weight % 1,4-butadiene 50.0; Tg=−47.9° C.; weight average molecular weight $2.18 \times 10^5$; number average molecular weight $1.35 \times 10^5$. The fresh stock is designated "Control A".

In a second comparative example (Control B), a polymer was prepared as for Control A, except that the polymer was aged under ambient environmental conditions for 12 months prior to compounding.

Example 5

In order to demonstrate the methods of preparation and properties of the vulcanizable elastomeric compositions of the invention employing the polymers prepared in Examples 1 to 4, five stocks of rubbers were prepared using the compounding formulations and mixing conditions shown in Tables 1 and 2.

In Table 3 are identified the polymers, their gum Mooney viscosities the prior to compounding, and the amount of SMO in the composition. The Mooney value was taken as the torque rise at 100° C. after the large rotor has rotated 4 minutes. The final stocks were sheeted and then were subsequently molded at 171° for 15 minutes.

As shown in Table 3, stocks 1, 2 and 3 are moisture stabilized polymers containing "m" phr of SMO. SMO added to the mixture of polymer, silica, and the like, during compounding of the composition is "n" phr. The total of "m+n" is 3 phr. Controls A and B are not moisture stabilized polymers. Therefore, when compounding each of the control stocks, all of the SMO was added during compounding of the composition.

TABLE 1

Formulations of Stock Rubbers

| Ingredient | Amount (phr) |
| --- | --- |
| Solution SBR terminated with alkoxysilane and moisture stabilized with sorbitan monooleate | 100 |
| Carbon Black (SAF) | 32 |
| Precipitated silica | 30 |
| Sorbitan Monooleate | varied |
| Naphthenic Process oil | 15 |
| Wax | 1.5 |
| Antioxidant [N-(1,3 dimethylbutyl)-N'-phenyl-p-phenylene-diamine] | 0.95 |
| Si69 | 0.5 |
| Sulfur | 2.37 |
| Stearic acid | 1.5 |
| Accelerator [N-Cyclohexyl-2-benzothiazyl-sulfenamide] | 1.5 |
| Diphenyl Guanidine | 0.5 |
| Zinc oxide | 2.5 |

TABLE 2

Mixing Conditions

| | |
| --- | --- |
| Mixer | 310 g Brabender |
| Agitation Speed | 60 rpm |
| Master Batch Stage | |
| Initial Temperature | 100° C. |
| 0 seconds | charging polymers |
| 30 seconds | charging carbon black, silica, sorbitan monooleate, and all pigments. |
| 5 min | drop |
| Drop temperature | 175° C. |
| Remill Stage | |
| Initial Temperature | 70° C. |
| 0 seconds | charging master batch stock. |
| 30 seconds | charging Si69 |
| Drop Temperature | 155° C. |
| Final Stage | |
| Initial Temperature | 90° C. |
| 0 seconds | charging remilled stock |
| 30 seconds | charging curing agent and accelerators |
| Drop Temperature | 105° C. |

TABLE 3

TEOS-Terminated Polymers and SMO Used

| Stock No. | Polymer (phr) | Polymer Age | Polymer Neutralized with EHA | Gum Mooney Viscosity | "m" SMO (phr) | "n" SMO (phr) | m + n, Total SMO (phr) |
| --- | --- | --- | --- | --- | --- | --- | --- |
| Control A | 100.00 | fresh | Yes | 42.0 | 0.00 | 3.00 | 3 |
| Control B | 100.00 | 12 months | Yes | 60.0 | 0.00 | 3.00 | 3 |

TABLE 3-continued

TEOS-Terminated Polymers and SMO Used

| Stock No. | Polymer (phr) | Polymer Age | Polymer Neutralized with EHA | Gum Mooney Viscosity | "m" SMO (phr) | "n" SMO (phr) | m + n, Total SMO (phr) |
|---|---|---|---|---|---|---|---|
| Stock 1 | 102.64 | fresh | No | 30.5 | 2.64 | 0.36 | 3 |
| Stock 2 | 102.64 | fresh | Yes | 33.0 | 2.64 | 0.36 | 3 |
| Stock 3 | 100.51 | fresh | Yes | 34.0 | 0.51 | 2.49 | 3 |

The Mooney viscosity of each of the five green stocks at each mixing stage prior to curing was measured at 130° C. using a large rotor and recorded as the torque when the rotor had rotated for 4 minutes. The stocks were preheated to 130° C. prior to starting the rotor. As illustrated in Table 4, the compound Mooney viscosities of invention stocks 1, 2 and 3 are lower in every mixing stage compared to Controls A and B. These lower viscosities can be correlated to the viscosities of the gum polymers, which were also lower than the control polymers which were not moisture stabilized. The compound Mooney viscosity of the Control B stock, which employs an aged polymer that was not moisture stabilized is higher than each of the compounds employing the fresh gum polymers, at every mixing stage. A reduced compound Mooney viscosity is advantageous because it provides better processability and handling, especially during the extrusion process.

The green stocks obtained after the final stage, prior to curing, were then characterized as to Mooney scorch time, Payne effect, and curing characteristics. The $t_5$ time is the time required to increase by five Mooney units during the Mooney-scorch measurement, and is used as an index to predict how fast the compound viscosity will rise during a subsequent processing step, such as extrusion. The times for the torque to rise to 2% and 90% of the total torque increase during curing, are the $t_{S2}$ and $t_{90}$, respectively, and are used to predict the speed of viscosity increase ($t_{S2}$) and the cure rate during the cure process ($t_{90}$). The Payne effects of the green compounds were measured using the RPA 2000 viscometer (Alpha Technologies). The strain sweep test was conducted at 50° C. at 6 cycles per minute using strain sweeping from 0.25% to 1000%. The results of the testing are illustrated in Table 5.

TABLE 4

Green Compound Mooney Viscosity At Each Mixing Stages

| Stock No. | Master Batch | Remill | Final Batch |
|---|---|---|---|
| Control A | 57.2 | 87.6 | 72.3 |
| Control B | 75.0* | 97.6 | 78.9 |
| Stock 1 | 56.2 | 83.0 | 69.3 |
| Stock 2 | 52.2 | 76.6 | 66.7 |
| Stock 3 | 50.9 | 75.1 | 65.3 |

*The 75.0 value is taken as $MS_{1+4}$ × 1.8. Torque exceeds the machine limit when a large rotor is used.

The green stock (i.e., the stock obtained after the remill stage) was characterized as to Mooney viscosity and Payne effect (ΔG') and cure characteristics.

As shown in Table 5, the $t_5$ of stocks 2, and 3 are longer than the controls. This gives the stocks a great advantage of wider processing time window, especially during the extrusion process, without greatly raising the compound Mooney viscosity. Longer $t_{S2}$ in these compounds compared to the controls give stocks enough time to flow and to fill the mold better. The relatively fast curing rate of stocks 1, 2, and 3 is another advantage. In general, the processibility of these SMO moisture stabilized stocks is better than that of stocks with SMO added only during mixing.

TABLE 5

The Green Stock Mooney Viscosity and Cure Characteristics

| Stock No. | $t_5$ Scorch @ 130° C. (minutes) | ΔG'(G' @ .25% - G' @ 1000%) (kPa) | $t_{S2}$ @ 171° C. (minutes) | $t_{90}$ @ 171° (minutes) |
|---|---|---|---|---|
| Control A | 20.25 | 772 | 2.03 | 12.62 |
| Control B | 19.35 | 923 | 2.01 | 15.66 |
| Stock 1 | 20.15 | 792 | 2.06 | 13.65 |
| Stock 2 | 23.78 | 687 | 2.23 | 11.63 |
| Stock 3 | 24.60 | 639 | 2.31 | 11.00 |

The ΔG' before and after annealing and Δ(ΔG') results are illustrated in Table 6. The ΔG' is calculated as the difference between G' at 0.25% strain and the G' at 1000% strain.

A good silica-processing aid should be able to disperse the silica filler during mixing of the compound and stabilize the dispersion during storage and curing processes. The stabilization of silica filler morphologies is evaluated by comparing the differences in Payne effect data, Δ(ΔG'), which were obtained from the remill stocks before and after they were annealed at 171° C. for 15 minutes. This annealing condition is also the curing condition used. Since these stocks do not have curatives, an increase in the G' due to sulfur crosslinking can be excluded. The Δ(ΔG') shows the extent of filler flocculation and how effectively the processing aid shields the silica grains from each other during curing. In Table 6, the Δ(ΔG') of stocks 1, 2 and 3 are 30–35% lower than control A. The data indicate less filler reagglomeration after curing in these stocks. Hence, the SMO shields the silica grains from each other more effectively when using SMO moisture stabilized polymer (i.e., when SMO is added in the polymerization stage) than when using polymer stock that is not SMO viscosity stabilized.

TABLE 6

ΔG' Of The Remill Stocks Before And After Annealing At 171° C. For 15 Minutes

| Stock No. | ΔG' (kPa) before annealing | ΔG' (kPa) after annealing | Δ(ΔG') (kPa) |
|---|---|---|---|
| Control A | 1009 | 2100 | 1091 |
| Control B | 1074 | 2459 | 1385 |
| Stock 1 | 1192 | 1948 | 756 |
| Stock 2 | 1153 | 1872 | 719 |
| Stock 3 | 1116 | 1756 | 740 |

The dynamic viscoelastic properties of cured stocks are listed in Table 7 where modulus at −20° C. and tan δ at 0°

C. and 50° C. were obtained from temperature sweep experiments. Temperature sweep experiments were conducted at a frequency of 31.4 rad/sec using 2% strain for temperatures ranging from −100° C. to −10° C., and 5% strain for the temperatures ranging from −10° C. to 100° C. Payne effect (ΔG') and tan δ at 7% strain were obtained from the strain sweep experiment. A frequency of 3.14 rad/sec was used for strain sweep which is conducted at 65° C. with strain sweeping from 0.25% to 14.75%. In general, the better shielded stocks 1, 2, and 3 have lower G', Payne effect, and hysteresis.

TABLE 7

Viscoelastic Properties vs. Temperature And Strain Sweeps

| Stock No. | G' @ −20° C. (MPa) | tan δ @ 0° C. | tan δ @ 50° C. | ΔG' (G' @ .25% − G' @ 14.75%) (MPa) | tan δ at 7% strain |
|---|---|---|---|---|---|
| Control A | 18.91 | 0.2426 | 0.1451 | 0.8845 | 0.0913 |
| Control B | 28.76 | 0.2809 | 0.1489 | 0.97 | 0.0890 |
| Stock 1 | 17.35 | 0.2322 | 0.1356 | 0.57 | 0.0814 |
| Stock 2 | 15.11 | 0.2271 | 0.1380 | 0.75 | 0.0948 |
| Stock 3 | 16.41 | 0.2365 | 0.1431 | 0.58 | 0.0892 |

For Table 8, the tensile mechanical properties were measured using the standard procedure described in the ASTM-D 412 at 25° C. The tensile test specimens are round rings with a dimension of 0.05 inches in width and 0.075 inches in thickness. A specific gauge length of 1.0 inches is used for the tensile test.

Table 8 lists the tensile mechanical properties. The mechanical properties of the SMO viscosity stabilized stocks are equal to those of control A. This indicates that the viscosity stabilizing SMO does not have any adverse effects on the mechanical properties of the ultimate rubber.

TABLE 8

Tensile Mechanical Properties At 25° C.

| Stock No. | M50 (psi) | M300 (psi) | Strength, Tb (psi) | Elongation at break, Eb (%) | Toughness |
|---|---|---|---|---|---|
| Control A | 210 | 2037 | 2784 | 370 | 4086 |
| Control B | 207 | 2128 | 2647 | 348 | 3670 |
| Stock 1 | 212 | 2084 | 2616 | 350 | 3675 |
| Stock 2 | 206 | 1904 | 2886 | 401 | 4744 |
| Stock 3 | 211 | 2029 | 2739 | 368 | 4074 |

Hence, using a long chain alcohol in both the polymerization and compounding stage, as practiced according to the present invention, is effective in controlling any rise in Mooney viscosity upon aging of an alkoxysilane-modified polymer. It provides other benefits such as reducing rolling resistance. By including the alcohol (such as SMO in the example above) in the polymerization stage, only a small amount of the alcohol processing aid is needed in the compounding stage.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:
1. A vulcanizable elastomeric composition, comprising:
a moisture stabilized polymer comprising the hydrolysis reaction product of a hydrolyzable substituent of an alkoxysilane terminated polymer reacted with a viscosity stabilizing effective amount of a viscosity stabilizing agent comprising a first long chain alcohol, prior to contacting the polymer with water;
a reinforcing filler comprising silica or a mixture thereof with carbon black;
a processing aid selected from the group consisting of a second long chain alcohol, an alkyl alkoxysilane, and mixtures thereof; and
a cure agent comprising an effective amount of sulfur to achieve a satisfactory cure of the composition.

2. The composition of claim 1, wherein the moisture stabilized polymer in the composition contains the viscosity stabilizing agent in an amount of "m" parts by weight per hundred parts rubber, and the processing aid is present in an amount of "n" parts by weight per hundred parts rubber, based on the weight of the silica, and "m+n" is about one to about 15 parts by weight per hundred parts rubber.

3. The composition of claim 2, wherein m+n is 0.1% to 150% by weight of the silica.

4. The composition of claim 1, wherein the first long chain alcohol is selected from the group consisting of aliphatic, cycloaliphatic, and aromatic alcohols having more carbon atoms than the hydrolyzable substituent.

5. The composition of claim 1, wherein the first and second long chain alcohols are the same or different from each other and are independently selected from the group consisting of aliphatic, cycloaliphatic, and aromatic alcohols having at least six carbon atoms.

6. The composition of claim 1, wherein the first and second long chain alcohols are the same or different from each other and are independently selected from the group consisting of multi-hydroxy fatty acid esters of hydrogenated and non-hydrogenated $C_5$ and $C_6$ sugars, polyoxyethylene derivatives of multi-hydroxy fatty acid esters of hydrogenated and non-hydrogenated $C_5$ and $C_6$ sugars, and mixtures thereof.

7. The composition of claim 6, wherein the fatty acid esters are selected from the group consisting of sorbitan monooleate, sorbitan dioleate, sorbitan trioleate, sorbitan sesquioleate, sorbitan laurate, sorbitan palmitate, sorbitan stearate, and mixtures thereof.

8. The composition of claim 7, wherein the fatty acid ester is sorbitan monooleate.

9. The composition of claim 1, wherein the alkyl alkoxysilane has the formula

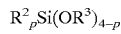

$$R^2_p Si(OR^3)_{4-p}$$

wherein the alkoxy groups are the same or different from each other, each $R^2$ independently comprises $C_1$ to about $C_{20}$ aliphatic, about $C_5$ to about $C_{20}$ cycloaliphatic, or about $C_6$ to about $C_{20}$ aromatic, each $R^3$ independently comprises $C_1$ to about $C_6$, and p is an integer from 1 to 3.

10. The composition of claim 9, wherein the alkyl alkoxysilane is selected from the group consisting of alkyl trialkoxysilanes.

11. The composition of claim 9, wherein the alkyl alkoxysilane is selected from the group consisting of octyl triethoxysilane, octyl trimethoxysilane, trimethyl ethoxysilane, cyclohexyl triethoxysilane, iso-butyl triethoxysilane, ethyl trimethoxy silane, hexyl tributoxy silane, dimethyl diethoxysilane, methyl triethoxysilane, propyl triethoxysilane, hexyl triethoxysilane, heptyl triethoxysilane, nonyl triethoxysilane, octadecyl triethoxysilane, methyl octyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyl octyl dimethoxysilane, and mixtures thereof.

12. The composition of claim 1, wherein the effective amount of the viscosity stabilizing agent is about one to about 50 mole equivalents of the agent per each mole equivalent of an anionic initiator used in the polymerization of the alkoxysilane terminated polymer.

13. The composition of claim 12, wherein the effective amount of the viscosity stabilizing agent is about one to about 20 mole equivalents of the agent per each mole equivalent of the anionic initiator used in the polymerization of the alkoxysilane terminated polymer.

14. The composition of claim 13, wherein the effective amount of the viscosity stabilizing agent is about one to about 5 mole equivalents of the agent per each mole equivalent of the anionic initiator used in the polymerization of the alkoxysilane terminated polymer.

15. The composition of claim 14, wherein the effective amount of the viscosity stabilizing agent is one mole equivalent of the agent per each mole equivalent of the anionic initiator used in the polymerization of the alkoxysilane terminated polymer.

16. The composition of claim 1, wherein the processing aid is fully or partially supported on the reinforcing filler.

17. The composition of claim 1, wherein the moisture stabilized polymer is selected from the group consisting of homopolymers of conjugated diene monomers, and copolymers and terpolymers of the conjugated diene monomers with monovinyl aromatic monomers and trienes.

18. The composition of claim 17, wherein the moisture stabilized polymer is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

19. A pneumatic tire comprising a component produced from a vulcanized elastomeric composition comprising a moisture stabilized polymer that comprises the hydrolysis reaction product of a hydrolyzable substituent of an alkoxysilane terminated polymer reacted with a viscosity stabilizing effective amount of a viscosity stabilizing agent comprising a first long chain alcohol, prior to contacting the polymer with water;

a reinforcing filler comprising silica or a mixture thereof with carbon black;

a processing aid selected from the group consisting of a second long chain alcohol, an alkyl alkoxysilane, and mixtures thereof; and a cure agent comprising an effective amount of sulfur to achieve a satisfactory cure of the composition.

20. The tire of claim 19, wherein the moisture stabilized polymer is selected from the group consisting of homopolymers of conjugated diene monomers, and copolymers and terpolymers of the conjugated diene monomers with monovinyl aromatic monomers and trienes.

21. The tire of claim 20, wherein the moisture stabilized polymer is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

22. A method of preparing a vulcanized elastomeric compound, comprising the steps of:

mixing together in a mixer a moisture stabilized polymer comprising the hydrolysis reaction product of a hydrolyzable substituent of an alkoxysilane terminated polymer reacted with a viscosity stabilizing effective amount of a first long chain alcohol viscosity stabilizing agent, prior to contacting the polymer with water, a reinforcing filler comprising silica or a mixture thereof with carbon black, a processing aid selected from the group consisting of a second long chain alcohol, an alkyl alkoxysilane, and mixtures thereof, and a cure agent comprising an effective amount of sulfur to achieve a satisfactory cure of the composition; and effecting vulcanization.

23. The method of claim 22, wherein the moisture stabilized polymer in the composition contains the viscosity stabilizing agent in an amount of "m" parts by weight per hundred parts rubber, and the processing aid is present in an amount of "n" parts by weight per hundred parts rubber, based on the weight of the silica, and "m+n" is about one to about 15 parts by weight per hundred parts rubber.

24. The method of claim 23, wherein m+n is 0.1% to 150% by weight of the silica.

* * * * *